No. 660,593. Patented Oct. 30, 1900.
A. SCHOEN.
COP WINDING MACHINE.
(Application filed June 26, 1900.)
(No Model.) 2 Sheets—Sheet 1.
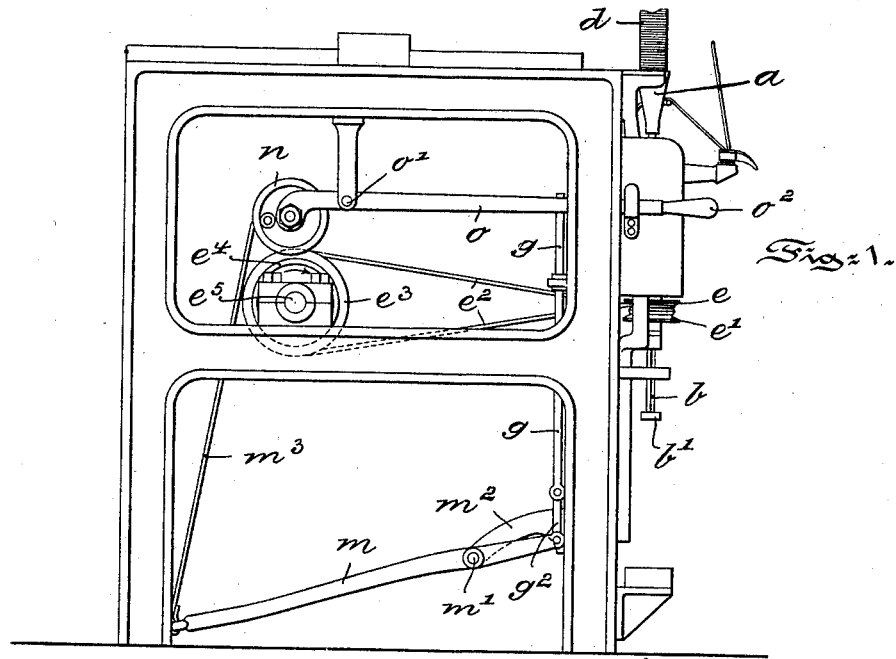
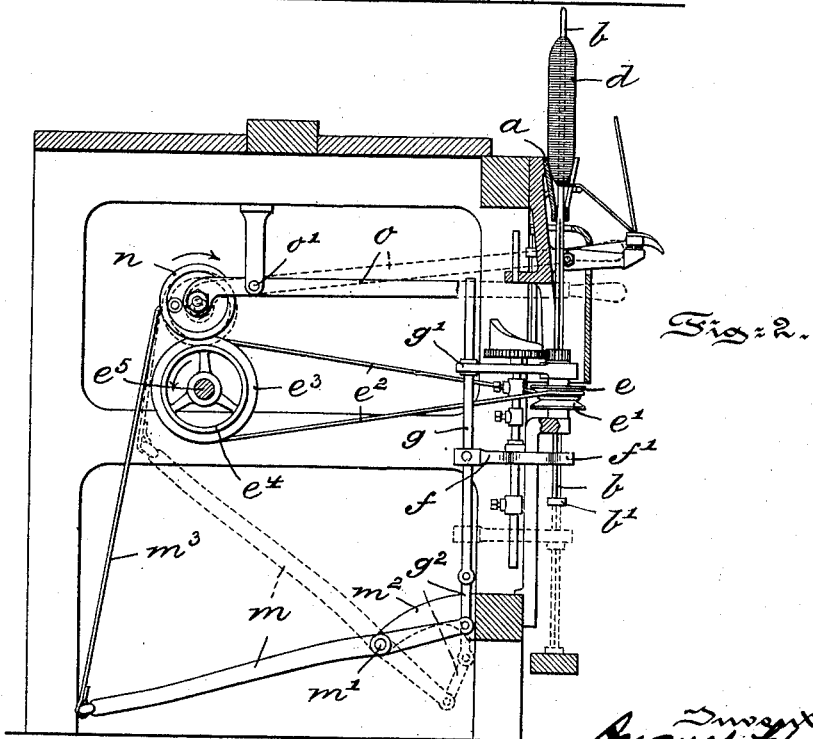

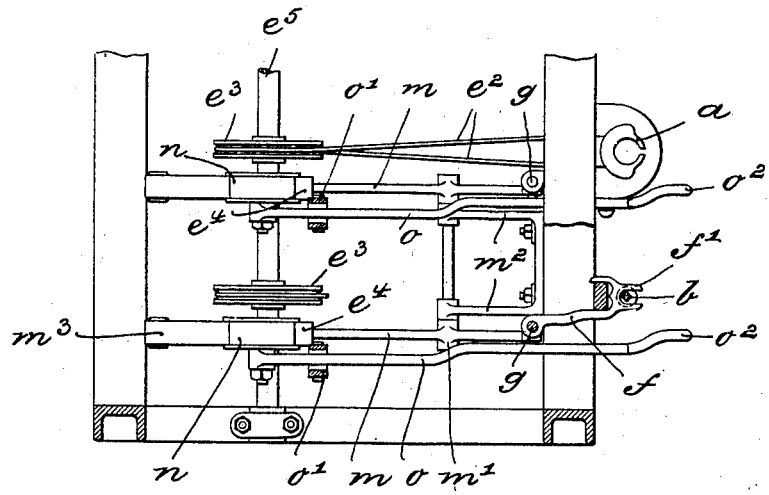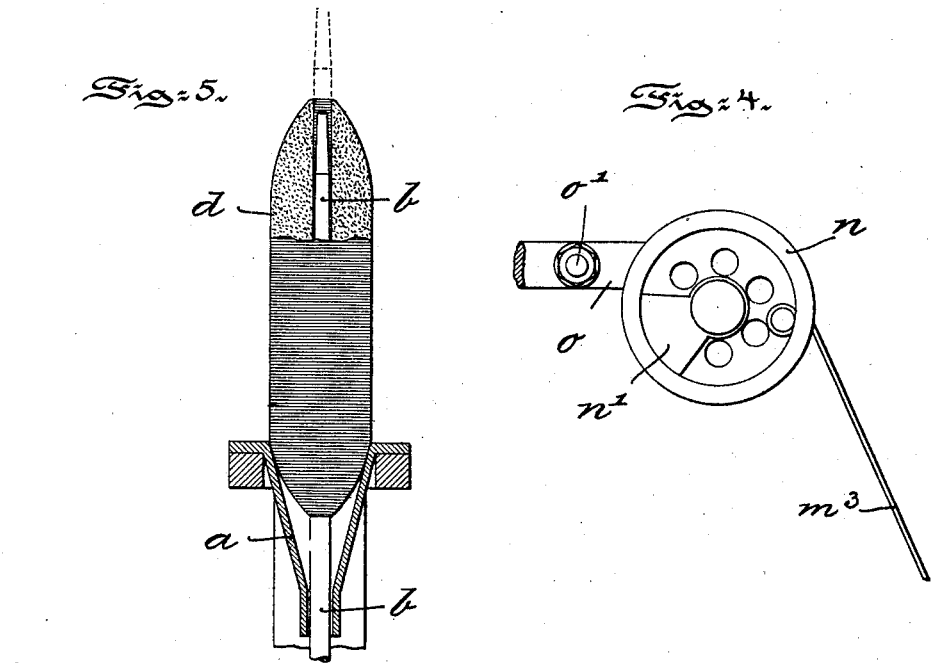

United States Patent Office.

AUGUST SCHOEN, OF PHILADELPHIA, PENNSYLVANIA, ASSIGNOR TO SAMUEL B. STINSON, ROBERT J. STINSON, JOSEPH C. STINSON, AND THOMAS STINSON, OF SAME PLACE.

COP-WINDING MACHINE.

SPECIFICATION forming part of Letters Patent No. 660,593, dated October 30, 1900.

Application filed June 26, 1900. Serial No. 21,608. (No model.)

*To all whom it may concern:*

Be it known that I, AUGUST SCHOEN, a citizen of the United States, residing at the city of Philadelphia, in the county of Philadelphia and State of Pennsylvania, have invented certain new and useful Improvements in Cop-Winding Machines, of which the following is a specification.

My invention has relation to a means for mechanically and instantaneously releasing cops from the spindles of that class of cop-winding machines in which an upright spindle is used in the winding of shuttle-cops.

The principal object of my invention is to provide in a cop-winding machine a vertically-arranged spindle having at or near its lower end a head or collar, means for rotating said spindle, and mechanism controlled by said means adapted to impinge upon said head and to force said head and spindle vertically downward to withdraw the spindle from the cop. Heretofore in machines of this type after the cop was wound it was removed or its removal attempted by hand, the operator seizing the upper end of the spindle and raising and lowering the spindle several times rapidly. The concussion of the cop in the cone-cup was relied upon to release the cop from the spindle. This method has many disadvantages, not only being tedious and laborious, but also resulting in such a distortion of the cop as to prevent the after use of the cop in the shuttle. To accelerate the hand removal of the cop, the lower end of the spindle was provided with a weight; but this weighting was responsible for malformation of the cop, frequently resulting in the formation of several cops in the same spindle, which cops were but loosely joined together. Another method of removing the cop from the spindle was that in which a treadle mechanism was connected with the lower end of the spindle, and this treadle mechanism was operated at the proper time by the foot of the operator. So much force, however, had to be used on the treadle, and the release of the cop after one or more trials was so sudden, that the operator's foot and limb speedily became tired and frequently injured by the sudden and unexpected fall of the treadle when the cop was released. By my present improvement all these disadvantages are avoided and the cop released instantaneously by the machine without either counterweighting the spindle or manipulating the spindle either by hand or foot power.

The nature and scope of my invention will be more fully understood from the following description, taken in connection with the accompanying drawings, forming part hereof, in which—

Figure 1 is a side elevational view of a portion of a cop-winding machine and of the cop-releasing mechanism embodying my invention applied thereto. Fig. 2 is a vertical sectional view of Fig. 1. Fig. 3 is a view partly in plan and partly in section. Fig. 4 is a side elevational view, enlarged, of the frictional pulley and its counterweight, said pulley forming a portion of the means for releasing the cop; and Fig. 5 is an enlarged view, partly in side elevation and partly in section, of the cop, the spindle, and the cone-cup, illustrating the withdrawal of the spindle from the cop.

In the drawings the invention is illustrated as applied to a cop-winding machine constructed in substantial accordance with Letters Patent No. 585,247, dated June 29, 1897; but it will be readily understood that the invention may with slight mechanical changes be applied to other types of vertical spindle-cop-winding machines without departing from the spirit and scope of my present invention.

Referring now to the drawings, $a$ represents the cone-cup; $b$, the spindle rotating therein; $d$, the cop formed on the spindle above the cup $a$, and $e$ and $e'$ the fast and loose pulleys adapted to control the rotation of the spindle $b$. The fast pulley $e$ is normally operated by a belt $e^2$ from the main or driving pulley $e^3$. The lower end of the spindle $b$ is provided with a head or collar $b'$, and surrounding the square portion of the spindle $b$ above the collar $b'$ is the forked projection $f'$ of a bracket $f$. This bracket $f$ is secured to and moves vertically with a rod or bar $g$, which rod or bar $g$ is guided or slides in a suitable eyepiece $g'$, which projects from a fixed portion of the machine. At the lower end of the rod $g$ is pivoted one end of a link $g^2$, the other end of which link being pivoted to one end of a lever-arm $m$. This lever-arm $m$ is pivoted, as at $m'$, in a bracket $m^2$ of the machine and is connected at its other end by a strap $m^3$ to the periphery of a wheel $n$. The wheel $n$ is pivoted in the end of a hand-lever $o$, which lever has a fulcral point $o'$, intermediate of the wheel $n$ and the handle $o^2$ of the lever. The handle $o^2$ projects to the front of the machine, so as to be readily accessible to the operator. The wheel $n$ normally occupies a position directly above a pulley $e^4$ on the driving-shaft $e^5$, but not in frictional contract therewith, and is preferably counterweighted, as at $n'$, (see Fig. 4,) so as to be maintained in a practically-balanced condition with respect to the strap $m^3$ and the lever-arm $m$—that is, the strap $m^3$, being normally pulled downward by the lever-arm $m$, is held taut by the counterweight $n'$ of the wheel $n$.

The operation of the device is as follows: The cop being completely wound up by the machine, the operator lifts the handle $o^2$ of the lever $o$ and brings the wheel $n$ down upon the pulley $e^4$ into such close frictional contact that the wheel $n$ is rotated rapidly by the driving-pulley. The strap $m^3$ on the periphery of the wheel $n$ is now rapidly wound up and the lever-arm $m$ is quickly operated to depress through the link $g^2$ the rod or bar $g$. The depression of the rod or bar $g$ carries the bracket $f$ rapidly downward and causes its forked projection $f'$ to strike suddenly upon the collar $b'$ of the spindle $b$ with sufficient force to cause the spindle to be sufficiently drawn downward through the cop $d$ to permit of the ready removal of the cop from the spindle, as illustrated in Fig. 5. When now the handle $o^2$ is released, the wheel $n$ will be lifted out of frictional contact with the pulley $e^3$ and the lever-arm $m$ will return to its normal position, the strap $m^3$ unwinding from the wheel $n$.

Having thus described the nature and object of my invention, what I claim as new, and desire to secure by Letters Patent, is—

1. In a cop-winding machine, a vertically-arranged spindle having at or near its lower end a head, means for rotating said spindle and mechanism, controlled by said means, adapted to impinge upon said head and to force said head and spindle vertically downward to withdraw the spindle from the cop, substantially as and for the purposes described.

2. In a cop-winding machine, a spindle whereon the cop is formed, said spindle being arranged vertically in the machine, a driving-pulley adapted to rotate said spindle, a head formed on said spindle, a bracket surrounding the spindle above said head, and means controlled by the driving-pulley for rapidly depressing said bracket to cause the bracket to strike upon the spindle-head, substantially as and for the purposes described.

3. In a cop-winding machine, a spindle, a driving mechanism adapted to rotate said spindle, a wheel arranged above and normally out of frictional contact with the driving mechanism, means for causing the wheel to frictionally contact with a portion of said driving mechanism, a strap secured to the periphery of the wheel and adapted to be wound up thereon when the wheel is frictionally in contact with the driving mechanism, and means controlled by said strap for depressing said spindle, substantially as and for the purposes described.

In testimony whereof I have hereunto set my signature in the presence of two subscribing witnesses.

AUGUST SCHOEN.

Witnesses:
J. WALTER DOUGLASS,
THOMAS M. SMITH.